UNITED STATES PATENT OFFICE.

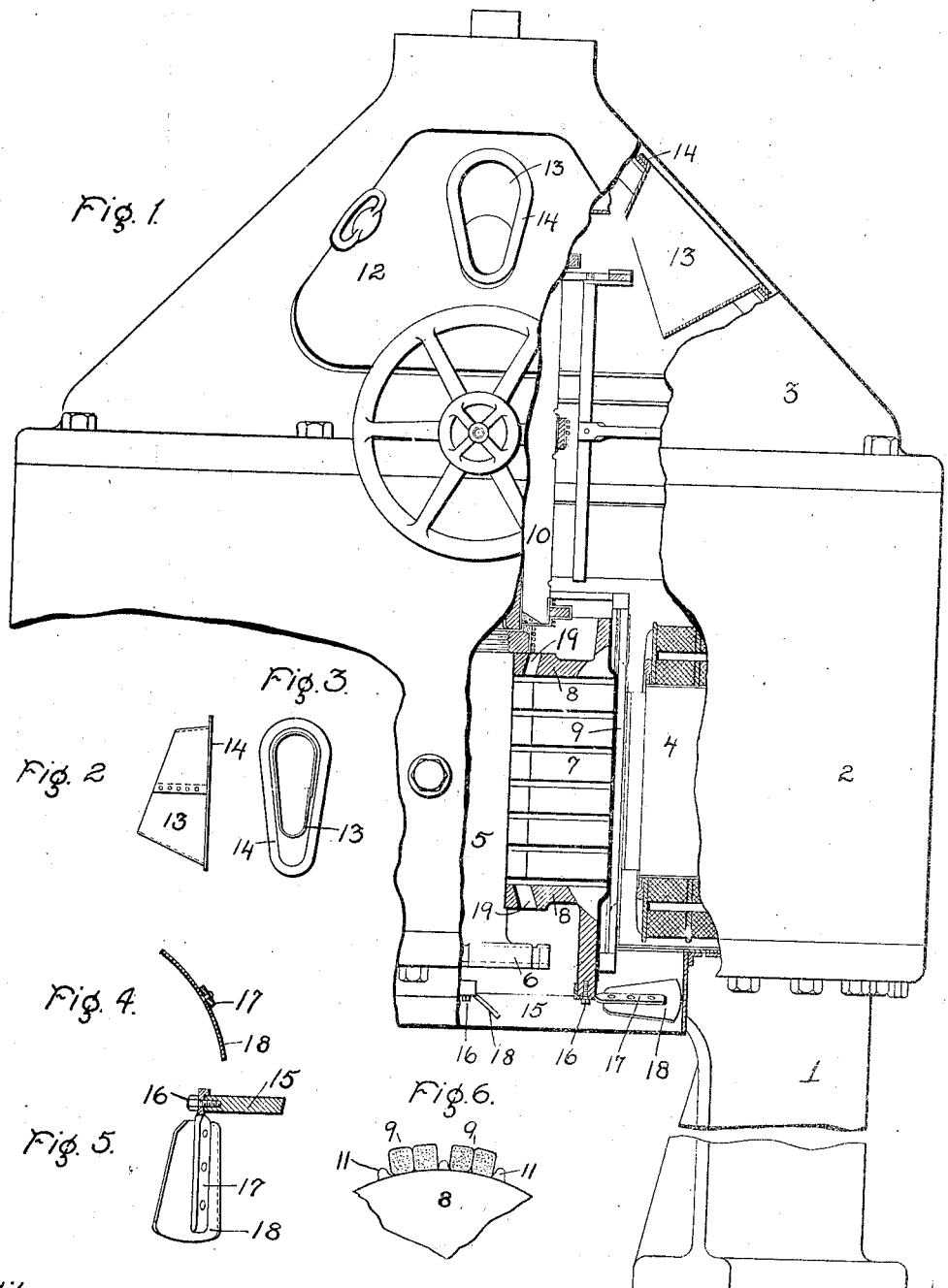

WILLIAM L. R. EMMET, OF SCHENECTADY, NEW YORK, ASSIGNOR TO GENERAL ELECTRIC COMPANY, A CORPORATION OF NEW YORK.

MEANS FOR COOLING DYNAMO-ELECTRIC MACHINES.

937,429.   Specification of Letters Patent.   Patented Oct. 19, 1909.

Application filed August 19, 1905. Serial No. 274,873.

*To all whom it may concern:*

Be it known that I, WILLIAM L. R. EMMET, a citizen of the United States, residing at Schenectady, county of Schenectady, State of New York, have invented certain new and useful Improvements in Means for Cooling Dynamo-Electric Machines, of which the following is a specification.

This invention relates to dynamo-electric machines and its object is to cool such machines and particularly the current collecting devices and armature windings thereof. Various modes of doing this have been tried, and it is found that the simplest and most effectual way is to wash the heated parts in streams of air by which the heat is rapidly absorbed and carried away. The present invention is applicable to different types of machines, but it has been especially designed for a generator arranged with its armature shaft vertical and driven by a steam turbine. The high rate of revolution necessitated by the use of a turbine engine causes considerable heating of the generator, so that some cooling device is quite necessary.

The invention consists in a fan rotating with the armature inside of a cylindrical hood and drawing air currents into the casing of the machine through chutes or spouts directed toward the current collecting device.

In the accompanying drawing, Figure 1 is a side elevation of a direct current machine embodying my invention, shown partly in section. Fig. 2 is a side view of an air spout. Fig. 3 is an end view of the same. Fig. 4 is a cross section of a fan blade. Fig. 5 is a side view of the same, and Fig. 6 is a cross-section of a portion of the armature winding.

The frame of the generator illustrated comprises a base 1 adapted to stand on the casing of a steam turbine (not shown), a cylindrical casing 2 supported on said base, and a conical skeleton top or bracket 3 carrying an upper shaft bearing. The field magnets 4 are secured to the inside of the casing 2 with their pole-faces vertical and concentric with the vertical armature shaft 5, whose upper end is journaled in the bracket 3. A flange 6 on the lower end of said shaft enables it to be coupled to the shaft of the turbine. The armature core 7 is held between the clamping heads 8, and the bar winding 9 is connected with the commutator bars 10 in the usual manner. Each of the bars 9 consists of a plurality of wires insulated with a coating of flexible heat-resisting oil enamel and compressed into a square bundle. The winding is but one layer deep, the bars being laid side by side between low driving horns 11 on the head 8. The current collecting devices in this machine comprise a commutator and coöperating brushes.

The commutator is at the upper end of the generator and extends up into the top 3. In order to protect the commutator, brushes and brush holders, the large openings between the ribs of said top are normally closed by removable covers 12. In one, two or more of said covers are air inlets, each provided with a chute or spout 13 projecting inwardly, and made preferably of sheet metal with a flange 14 secured to the cover 12 around the edge of the air inlet. The spouts are inclined downwardly in order to direct the inflowing streams of air upon the commutator.

In order to induce a flow of air into the casing, there is provided at some suitable point, a fan revolving with the armature. I prefer to provide the lower head 8 with a cylindrical flange 15 concentric with the shaft, which flange supports the windings of the armature and has secured thereto by screws 16 the radial arms 17 each carrying a fan-blade 18, preferably slightly curved in cross-section. The arms 17 extend outwardly and the fan-blades revolve inside a cylindrical hood of sheet metal secured to the frame of the machine concentric with the shaft.

The fan-blades are so inclined that when the generator is running they cause a flow of air in through the spouts 13, down over the commutator, through the air-gap between the field-magnet poles and the armature winding and through the passages 19 in the heads 8 and the core of the armature: thereby washing away the heat and keeping these parts reasonably cool in spite of their high speed.

As stated above, the air-inlet spouts are preferably mounted on covers which fill the openings between the ribs of the shaft-bearing bracket. But in some sizes of machines, it may be preferable to cast one or more of said covers integral with the bracket.

What I claim as new and desire to secure by Letters Patent of the United States, is,—

1. In a dynamo electric machine, the combination with a casing, of a shaft-bearing bracket therefor at the current collecting end of said machine, ribs on said bracket, said bracket having openings between its ribs, covers for said openings having air inlets, spouts projecting inwardly from said inlets and directed toward the current collecting devices, and a fan on the opposite end of the machine.

2. The combination with a dynamo electric machine having a casing, of a shaft-bearing bracket at the commutator end of said casing having air-inlets, spouts for said inlets projecting toward the commutator, a cylindrical flange on the opposite end of the armature, radial fan-blades mounted on said flange, and a cylindrical hood secured to the frame of the machine and surrounding said fan-blades.

3. In combination with the rotatable armature of a dynamo electric machine having current collecting means and a cylindrical flange at the opposite end from said current collecting means, said flange supporting the windings of said armature, of ventilating means for the dynamo electric machine consisting of a fan mounted on said flange, and a cylindrical hood surrounding the fan-blades.

In witness whereof, I have hereunto set my hand this 18th day of August, 1905.

WILLIAM L. R. EMMET.

Witnesses:
 BENJAMIN B. HULL,
 HELEN ORFORD.